US010252570B2

(12) United States Patent
Iwai et al.

(10) Patent No.: US 10,252,570 B2
(45) Date of Patent: Apr. 9, 2019

(54) BICYCLE RIM

(71) Applicant: Shimano Inc., Sakai, Osaka (JP)

(72) Inventors: Toru Iwai, Osaka (JP); Yoshikazu Kashimoto, Osaka (JP)

(73) Assignee: Shimano Inc., Osaka (JP)

( * ) Notice: Subject to any disclaimer, the term of this patent is extended or adjusted under 35 U.S.C. 154(b) by 170 days.

(21) Appl. No.: 15/466,456

(22) Filed: Mar. 22, 2017

(65) Prior Publication Data

US 2017/0349004 A1  Dec. 7, 2017

(30) Foreign Application Priority Data

Jun. 1, 2016  (JP) .................................. 2016-109956

(51) Int. Cl.
| | |
|---|---|
| *B60B 21/08* | (2006.01) |
| *B60B 5/02* | (2006.01) |
| *B60B 1/00* | (2006.01) |
| *B60B 21/02* | (2006.01) |
| *B60B 21/12* | (2006.01) |

(52) U.S. Cl.
CPC ................ *B60B 21/08* (2013.01); *B60B 5/02* (2013.01); *B05D 2201/00* (2013.01); *B05D 2256/00* (2013.01); *B05D 2502/00* (2013.01); *B05D 2504/00* (2013.01); *B60B 1/003* (2013.01); *B60B 21/025* (2013.01); *B60B 21/12* (2013.01); *B60B 2310/234* (2013.01); *B60B 2360/10* (2013.01); *B60B 2360/30* (2013.01); *B60B 2360/3412* (2013.01); *B60B 2360/50* (2013.01); *B60B 2900/572* (2013.01)

(58) Field of Classification Search
CPC ......... B60B 21/00; B60B 21/08; B60B 21/12; B60B 21/02; B60B 21/025; B60B 5/02
See application file for complete search history.

(56) References Cited

U.S. PATENT DOCUMENTS

| | | | |
|---|---|---|---|
| 5,056,630 A | 10/1991 | Fujii et al. | |
| 5,492,769 A | 2/1996 | Pryor et al. | |
| 6,338,574 B1 | 1/2002 | Shimizu et al. | |
| 6,354,668 B2 | 3/2002 | Okajima et al. | |
| 7,614,706 B2 | 11/2009 | Meggiolan et al. | |
| 8,070,235 B2 | 12/2011 | Reuteler | |

(Continued)

FOREIGN PATENT DOCUMENTS

EP  2030806 B1  8/2013

*Primary Examiner* — Kip T Kotter

(74) *Attorney, Agent, or Firm* — Global IP Counselors, LLP

(57) ABSTRACT

A bicycle rim basically includes a first annular side surface portion, a second annular side surface portion, an annular connecting portion and an outermost layer. The first annular side surface portion includes a first braking surface. The second annular side surface portion includes a second braking surface. The epoxy resin layer is an example of a nonmetallic layer. The annular connecting portion connects the first and second annular side surface portions. The soft additive granules are disposed in at least one of the first and second annular side surface portions. The epoxy resin layer is disposed in at least one of the first and second annular side surface portions. The soft additive granules are at least partially embedded in the epoxy resin layer. The outermost layer covers the epoxy resin layer and the soft additive granules.

19 Claims, 9 Drawing Sheets

(56) References Cited

U.S. PATENT DOCUMENTS

| | | | |
|---|---|---|---|
| 9,023,431 B2* | 5/2015 | Menzel | B05D 7/572 |
| | | | 427/487 |
| 2004/0090110 A1 | 5/2004 | Bernardi | |
| 2006/0267397 A1 | 11/2006 | Passamig et al. | |
| 2007/0102992 A1 | 5/2007 | Jager | |
| 2008/0265658 A1* | 10/2008 | Reuteler | B29C 70/345 |
| | | | 301/95.102 |
| 2009/0250995 A1 | 10/2009 | Tsai | |
| 2012/0056468 A1 | 3/2012 | Tsai | |
| 2014/0015307 A1 | 1/2014 | Poertner et al. | |
| 2014/0042798 A1* | 2/2014 | Iwai | B60B 5/02 |
| | | | 301/95.102 |
| 2015/0360510 A1* | 12/2015 | Poertner | B60B 1/003 |
| | | | 301/6.9 |
| 2016/0303903 A1 | 10/2016 | Kashimoto et al. | |

* cited by examiner

BICYCLE RIM

CROSS-REFERENCE TO RELATED APPLICATIONS

This application claims priority to Japanese Patent Application No. 2016-109956, filed on Jun. 1, 2016. The entire disclosure of Japanese Patent Application No. 2016-109956 is hereby incorporated herein by reference.

BACKGROUND

Field of the Invention

The present invention relates to a bicycle rim that constitutes a bicycle wheel.

Description of the Related Art

In general, a bicycle typically includes a frame forming a skeletal structure of a bicycle body, and a front wheel and a rear wheel are respectively mounted to front and rear ends of the frame. Each of the front wheel and the rear wheel is equipped with a rim to which a tire is mounted. The rim has an annular shape. The rim is connected to a hub by, for example, spokes. In recent years, a rim has been formed with a composite material obtained by combining different materials in order to achieve weight reduction in the rim while maintaining the strength of the rim. For example, a rim is disclosed in U.S. Pat. No. 7,614,706 that is made of carbon fibers.

SUMMARY

It has been discovered that bicycle rims that are made of carbon fibers or composite materials can be made to an attractive outer appearance.

One object presented in this disclosure is to provide a bicycle rim that has an excellent outer appearance.

A bicycle rim according to one aspect of the present invention includes a first annular side surface portion, a second annular side surface portion, an annular connecting portion, a plurality of soft additive granules, a nonmetallic layer and an outermost layer. The first annular side surface portion includes a first braking surface. The second annular side surface portion includes a second braking surface; an annular connecting portion. The annular connecting portion connects the first annular side surface portion and the second annular side surface portion. The soft additive granules are disposed in at least one of the first annular side surface portion and the second annular side surface portion. The nonmetallic layer is disposed in at least one of the first annular side surface portion and the second annular side surface portion, and the soft additive granules are at least partially embedded in the nonmetallic layer. The outermost layer covers the nonmetallic layer and the soft additive granules.

In the bicycle rim described above, because the nonmetallic layer and the soft additive granules are covered by the outermost layer, it is possible to provide a bicycle rim having an excellent outer appearance.

It is preferable that the outermost layer includes a pigment. In this case, the outermost layer can be colored, and it is therefore possible to provide a bicycle rim having a more excellent outer appearance.

It is preferable that the outermost layer is made of an acrylic or epoxy resin.

It is preferable that the soft additive granules are disposed in both of the first annular side surface portion and the second annular side surface portion.

It is preferable that the soft additive granules are partially embedded in the nonmetallic layer.

It is preferable that the soft additive granules are at least partially exposed from the nonmetallic layer.

It is preferable that the soft additive granules are embedded in the nonmetallic layer that has an outer ground surface partially exposing at least some of the soft additive granules.

It is preferable that the nonmetallic layer is a resin layer.

It is preferable that the nonmetallic layer includes an epoxy resin layer in an outermost surface thereof.

It is preferable that at least some of the soft additive granules are partially embedded in the epoxy resin layer.

It is preferable that the epoxy resin layer is formed on a glass fiber layer.

It is preferable that the soft additive granules are partially embedded in the glass fiber layer.

It is preferable that the soft additive granules are made of an elastomer material.

It is preferable that the elastomer material is a nitrile rubber.

It is preferable that the elastomer material is a fluorinated synthetic rubber.

It is preferable that the annular connecting portion includes a curved surface that extends between the first annular side surface portion and the second annular side surface portion, and a tire is engaged with the curved surface.

It is preferable that each of the first annular side surface portion and the second annular side surface portion includes an engagement portion provided along an outer circumferential edge to hold a tire.

It is preferable that the first annular side surface portion, the second annular side surface portion and the annular connecting portion are made of carbon.

It is preferable that the first annular side surface portion, the second annular side surface portion and the annular connecting portion are made of a metallic material.

According to the present invention, it is possible to provide a bicycle rim having an excellent outer appearance.

Also, other objects, features, aspects and advantages of the disclosed bicycle rim will become apparent to those skilled in the art from the following detailed description, which, taken in conjunction with the annexed drawings, discloses selected embodiments of the bicycle rim.

DETAILED DESCRIPTION OF THE INVENTION

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
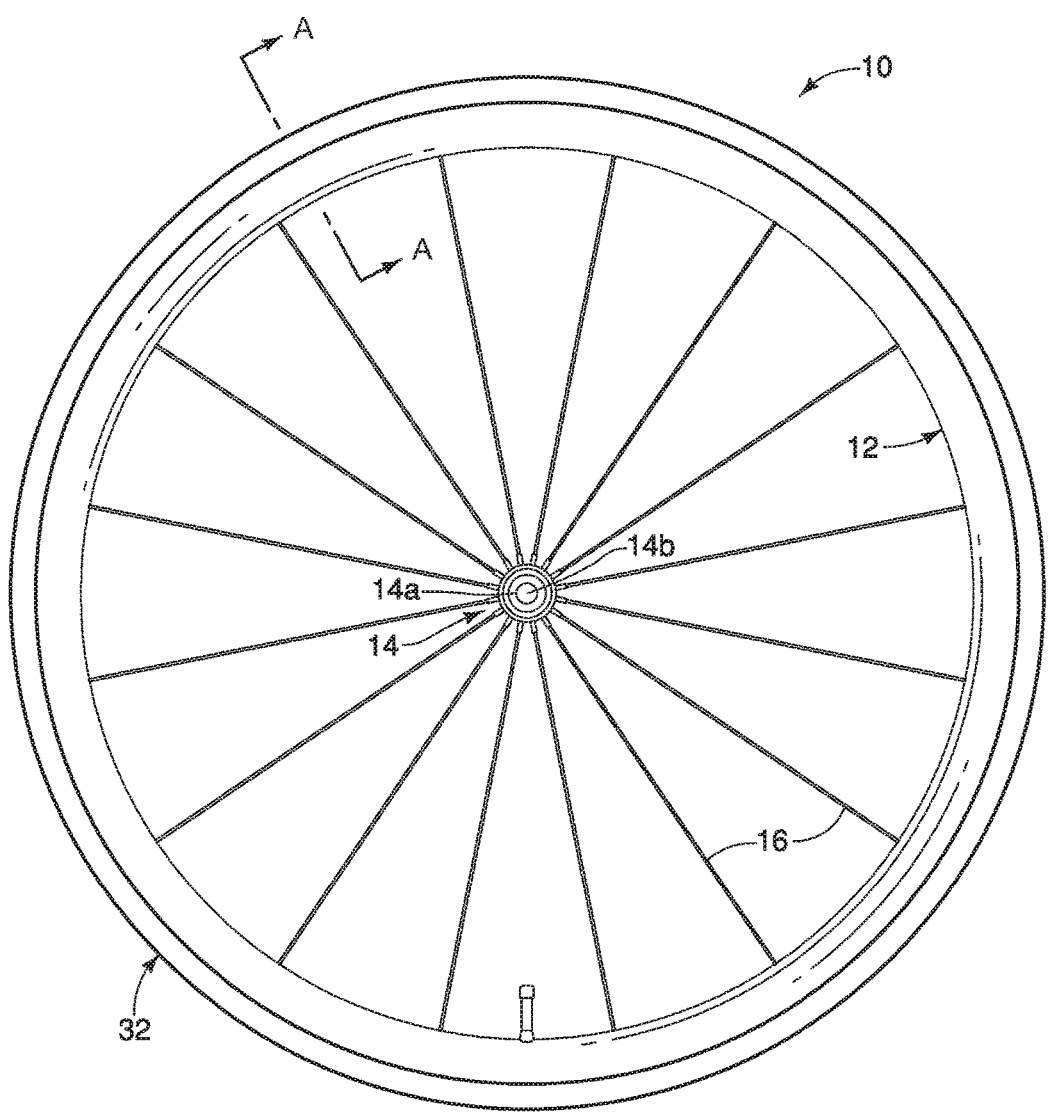
FIG. 1 is a side elevational view of a bicycle wheel equipped with a bicycle rim in accordance with a first embodiment.

FIG. 1 shows a bicycle wheel 10 in which a first embodiment of the present invention is employed. The bicycle wheel 10 is composed mainly of a bicycle rim 12, a hub assembly 14 and a plurality of spokes 16. The bicycle rim 12 is an annular member and is configured to rotate around a center rotation axis defined by a hub axle 14b of the hub assembly 14. The spokes 16 connect the bicycle rim 12 and the hub assembly 14 in a conventional manner that uses a conventional technique. Also, a pneumatic tire (not shown) is fixed to an outer circumferential surface of the bicycle rim 12 in a conventional manner.

The hub assembly 14 includes a hub shell 14a that is rotatably supported on the hub axle 14b by a pair of bearing units (not shown). The hub assembly 14 can be any type of bicycle hub assembly that can be applied to any type of the bicycle rim 12. Accordingly, a detailed description of the hub assembly 14 is omitted here. While only a front hub assembly is shown in this embodiment, the bicycle rim 12 can be used together with a rear hub assembly that forms a rear wheel as needed and/or desired.

There is no particular limitation on the spokes 16. For example, it is possible to use spokes made of a metallic material, spokes made of a composite material, a disk-shaped connecting member, and the like. Accordingly, a detailed description of the spokes 16 is omitted here. In the first embodiment, the spokes 16 are made of a metallic material and have a tension in the radial direction. The spokes 16 connect the hub assembly 14 to the bicycle rim 12 with spoke nipples provided at one or two ends of the spokes. In the first embodiment, as shown in FIG. 1, for example, sixteen spokes are disposed at equal intervals in the circumferential direction and connected to the bicycle rim 12.

A configuration is possible in which the eight spokes 16, which is included in the sixteen spokes 16, are disposed so as to extend from the center of the bicycle rim 12 to one side portion of the hub assembly 14, and the remaining eight spokes 16 are disposed so as to extend from the center of the bicycle rim 12 to the other side portion of the hub assembly 14. It is of course possible to use any other configurations. For example, all of the spokes can be configured as tangential spokes, or a combination of tangential spokes and radial spokes can be used. Of course, the number of spokes 16 is not limited to sixteen.

Figure 2:
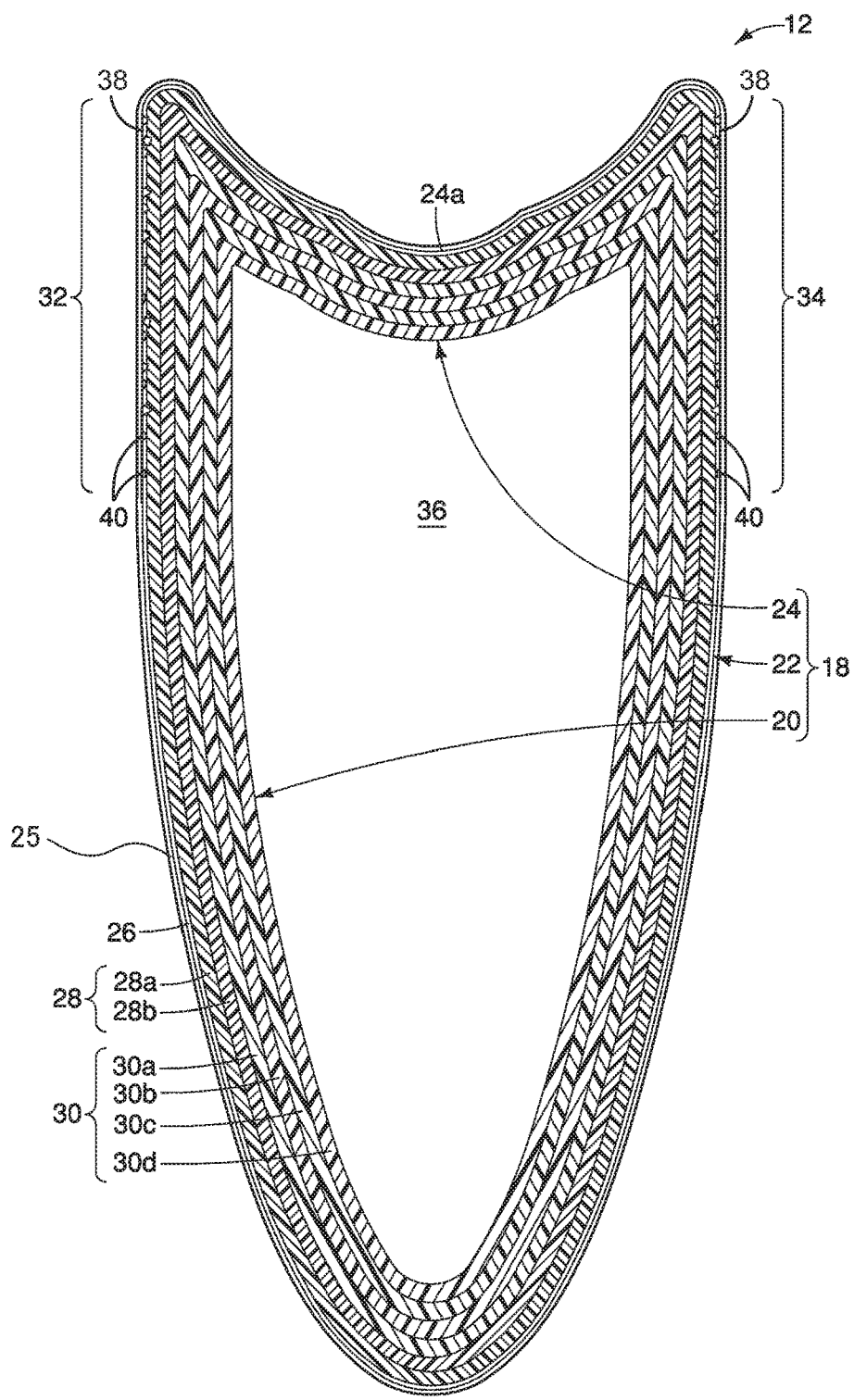
FIG. 2 is an enlarged cross-sectional view of a section of the bicycle rim taken along section line 1-1 shown in FIG. 1.

Turning now to FIG. 2, the bicycle rim 12 according to the first embodiment will now be discussed in more detail. The bicycle rim 12 according to the first embodiment is a completely nonmetallic composite rim. The bicycle rim 12 includes a body 18 which has a first annular side surface portion 20, a second annular side surface portion 22 and an annular connecting portion 24. The first annular side surface portion 20, the second annular side surface portion 22 and the annular connecting portion 24 are formed unitarily by a stacked nonmetallic layer. Specifically, the first annular side surface portion 20, the second annular side surface portion 22 and the annular connecting portion 24 are formed by a composite carbon layer 30. An epoxy resin layer 26 and a composite glass fiber layer 28 ("nonmetallic layer" specified in the claims) are formed so as to cover the first annular side surface portion 20, the second annular side surface portion 22 and the annular connecting portion 24. An outermost layer 25 is provided so as to cover the epoxy resin layer 26. Accordingly, the first annular side surface portion 20, the second annular side surface portion 22 and the annular connecting portion 24 are made of carbon. Also, the nonmetallic layer can be formed by a resin layer, and the epoxy resin layer 26 can be included in the outermost surface of the nonmetallic layer. The nonmetallic layer is not limited thereto, and the bicycle rim does not need to be a completely nonmetallic composite member.

The outermost layer 25 is disposed on the outermost surface of the body 18 of the bicycle rim 12. That is, the outermost layer 25 is disposed on the outermost surface of the bicycle rim 12 so as to cover the epoxy resin layer 26 and a plurality of soft additive granules 40 described later. The composite glass fiber layer 28 is disposed inwardly of the epoxy resin layer 26.

Also, the outermost layer 25 is made of an acrylic or epoxy resin. It is preferable that the outermost layer 25 includes a pigment to provide color to the outer appearance of the bicycle rim 12 that is different from a natural (non-pigment) color of the acrylic or epoxy resin. With this configuration, it is possible to provide a bicycle rim 12 having an excellent outer appearance.

The composite glass fiber layer 28 includes a first glass fiber sheet 28a and a second glass fiber sheet 28b. Each of the first and second glass fiber sheets 28a, 28b includes reinforced glass fibers that are impregnated with an epoxy resin and are oriented in one direction. The first and second glass fiber sheets 28a, 28b are laminated such that the reinforced glass fibers of the first and second glass fiber sheets 28a, 28b are oriented in different directions (intersecting directions in this embodiment). In this embodiment, the composite glass fiber layer 28 is composed of two sheets, namely, the first and second glass fiber sheets 28a, 28b, but the number of sheets can be reduced or increased as needed. Furthermore, if the body 18 or the bicycle rim 12 is formed mainly by a composite carbon layer 30 which includes the epoxy resin layer 26 on the outermost surface of the composite carbon layer 30, the composite glass fiber layer 28 can be removed.

The composite carbon layer 30 is disposed inwardly of the composite glass fiber layer 28. An annular internal space or region 36 is formed inside the composite carbon layer 30. The internal space or region 36 can be a void space, or can be filled with a foam material or the like.

The composite carbon layer 30 includes a first carbon sheet 30a, a second carbon sheet 30b, a third carbon sheet 30c and a fourth carbon sheet 30d. Each of the first to fourth carbon sheets 30a, 30b, 30c, 30d includes reinforced carbon fibers that are impregnated with an epoxy resin and are oriented in one direction. The first to fourth carbon sheets 30a, 30b, 30c, 30d are laminated such that the reinforced carbon fibers of each of the first to fourth carbon sheets 30a, 30b, 30c, 30d are oriented in a direction different from that of an opposing layer (a direction intersecting with an opposing layer in this embodiment). In this embodiment, the composite carbon layer 30 is composed of four sheets, namely, the first to fourth carbon sheets 30a, 30b, 30c, 30d, but the number of sheets can be reduced or increased as needed.

The first annular side surface portion 20 has a first braking surface 32 that is disposed in proximity to one end of the annular connecting portion 24. The second annular side surface portion 22 has a second braking surface 34 that is disposed in proximity to the other end of the annular connecting portion 24. The first and second braking surfaces 32, 34 come into contact with a brake pad (not shown) when the bicycle is operated by brakes. In this embodiment, the outermost layer 25 formed on each of the first and second braking surfaces 32, 34 that contacts with the brake pads (not shown), because an outermost surface 38 of the first and second braking surfaces 32, 34 is covered with the outermost layer 25. A braking force is thereby applied to the bicycle. In this embodiment, the outermost layer 25 and the outermost surface 38 of the first and second braking surfaces 32, 34 are formed of nonmetallic layers. Specifically, the outermost layer 25 is made of an acrylic or epoxy resin, and the outermost surface 38 includes the epoxy resin layer 26.

As shown in FIG. 2, the annular connecting portion 24 extends between the first annular side surface portion 20 and the second annular side surface portion 22 so as to connect the first annular side surface portion 20 and the second annular side surface portion 22. The annular connecting portion 24 has a tubular (tube-shaped) curved surface 24a (in other words, an annular outer circumferential surface), which extends between the first annular side surface portion 20 and the second annular side surface portion 22. A tire (not shown) is attached to the curved surface 24a.

Figure 3:
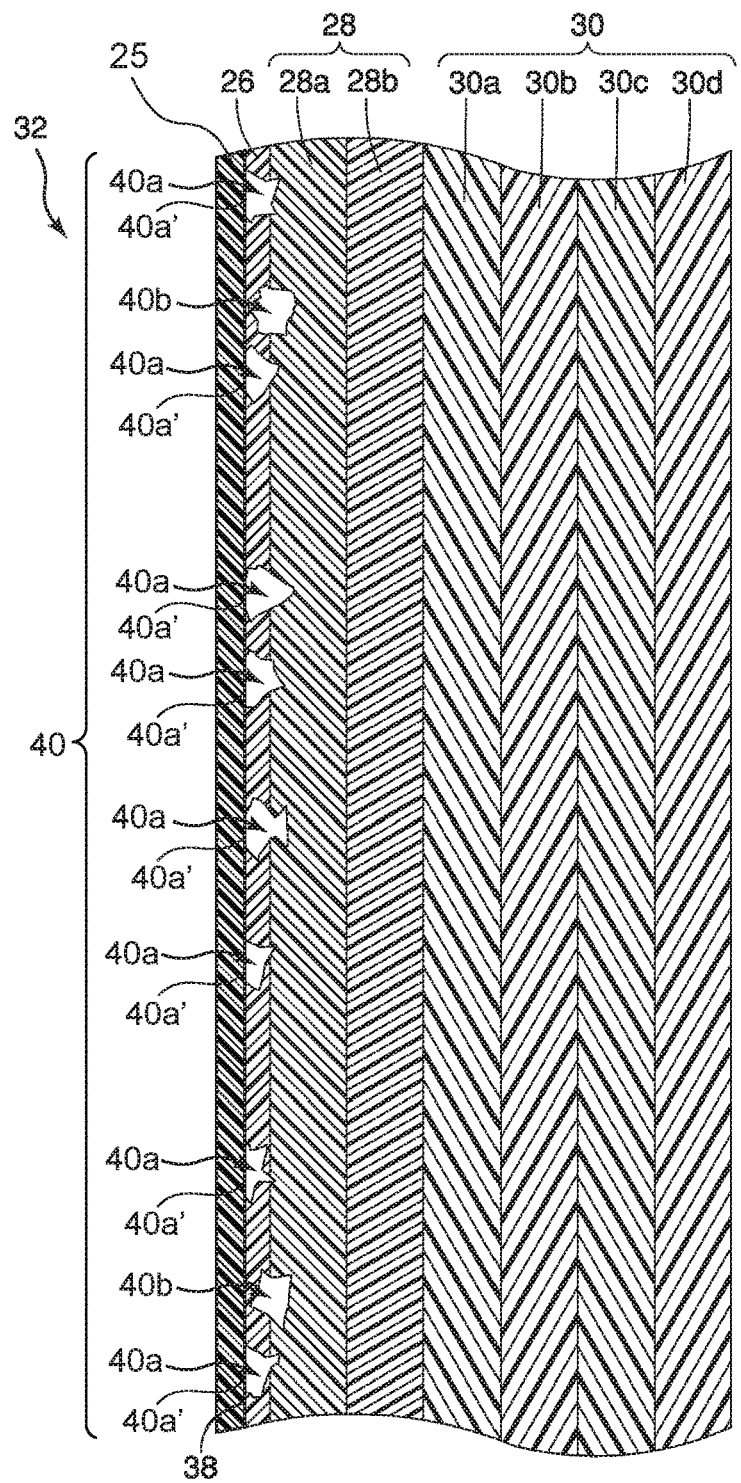
FIG. 3 is a partially enlarged view of a portion of the bicycle rim illustrated in FIG. 2.

FIG. 3 shows the first and second braking surfaces 32, 34 in more detail. As shown in FIG. 3, each of the first and second braking surfaces 32, 34 includes a plurality of soft additive granules 40. At least a portion of each of a plurality of soft additive granules 40 is embedded in the nonmetallic layer (the epoxy resin layer 26 and the composite glass fiber layer 28 in this embodiment). The soft additive granules 40 are disposed in at least one of the first annular side surface portion 20 and the second annular side surface portion 22. The soft additive granules 40 are preferably disposed in both of the first annular side surface portion 20 and the second annular side surface portion 22. Accordingly, the nonmetallic layer is also disposed in at least one of the first annular side surface portion 20 and the second annular side surface portion 22. The nonmetallic layer is preferably disposed in both of the first annular side surface portion 20 and the second annular side surface portion 22. The nonmetallic layer of either one of the first and second braking surfaces 32, 34 can include a plurality of soft additive granules 40. At least a portion of each of the soft additive granules 40 can be embedded therein.

The first braking surface 32 and the second braking surface 34 have the same configuration except that the orientations, in which the first braking surface 32 and the second braking surface 34 are disposed, are different. Accordingly, hereinafter, a detailed description will be given only of the first braking surface 32, with reference to FIG. 3.

As shown in FIG. 3, the first braking surface 32 includes a plurality of the soft additive granules 40 that are embedded in the epoxy resin layer 26 and the composite glass fiber layer 28. The soft additive granules 40 include soft granules 40a that are exposed from the epoxy resin layer 26, and soft granules 40b that are covered with the epoxy resin layer 26. Each of the soft granules 40a includes an exposed surface 40a' that is exposed from the epoxy resin layer 26 on a side surface side of the epoxy resin layer 26 that is in contact with the outermost layer 25. In this embodiment, the soft additive granules 40 are partially embedded in the epoxy resin layer 26 and the composite glass fiber layer 28. The soft additive granules 40 can be completely embedded in the epoxy resin layer 26, or can be partially or completely embedded only in the epoxy resin layer 26. Accordingly, the soft additive granules 40 can be partially embedded in the nonmetallic layer (the epoxy resin layer 26 in this embodiment).

The epoxy resin layer 26 is disposed on the composite glass fiber layer 28. The soft additive granules 40 are disposed dispersively in the epoxy resin layer 26. Each of the soft granules 40a of the soft additive granules 40 is partially exposed from the outermost surface 38 of the first and second braking surface 32, 34. Accordingly, in a state in which the outermost layer 25 has been removed, the soft additive granules 40 can be at least partially exposed from the nonmetallic layer (the epoxy resin layer 26 in this embodiment).

As shown in FIG. 3, each of the exposed soft granules 40a is partially exposed from the outermost surface 38 of the first braking surface 32. Of course, the second braking surface 34 can have the same configuration. It is preferable that the exposed surface 40a' of the soft additive granules 40 has a surface area which accounts for less than 50% of the total surface area of each of the soft additive granules 40. It is more preferable that the exposed surface 40a' of the soft additive granules 40 has a surface area which accounts for less than 20% of the total surface area of each of the soft additive granules 40.

It is desirable that the soft additive granules 40 are disposed only in regions forming the first and second braking surfaces 32, 34. The soft additive granules 40 include an elastomer material. The elastomer material is, for example, a nitrile rubber or a fluorinated synthetic rubber. The soft additive granules 40 include granules which has a predetermined grain size of 850 to 1000 μm. The soft additive granules 40 are irregularly shaped fine granules. However, if the soft additive granules 40 are formed by a different process, the soft additive granules 40 can be regularly shaped.

The composite glass fiber layer 28 and the composite carbon layer 30 are used to form the first and second braking surfaces 32, 34. It is preferable that the first glass fiber sheet 28a and the second glass fiber sheet 28b are epoxy resin-impregnated thin continuous reinforced glass fiber sheets, which are generally called prepreg sheets. Likewise, it is preferable that the first to fourth carbon sheets 30a, 30b, 30c, 30d are thin continuous reinforced carbon fiber sheets, which are generally called carbon prepreg sheets. Also, an epoxy resin can be added as a different member from a fiber sheet.

A procedure for forming a bicycle rim 12 will be explained with reference to the flowchart shown in FIG. 4 as follows. In step S10, the glass fiber sheets 28a, 28b for a composite glass fiber layer 28 and the carbon sheets 30a, 30*b*, 30*c*, 30*d* for a composite carbon layer 30 are placed in a die. In this embodiment, they are stacked in the die such that the composite glass fiber layer 28 lies on the composite carbon layer 30. It is preferable that soft additive granules 40 are embedded in advance in the glass fiber sheet 28*a*. The glass fiber sheet 28*a* including soft additive granules 40 forms first and second braking surfaces 32, 34. The soft additive granules 40 can be bonded along a region of the glass fiber sheet 28*a*. Furthermore, the soft additive granules 40, which are separated from the glass fiber sheet 28*a*, can be disposed in the die. FIG. 5 shows a state in which the first glass fiber sheet 28*a*, the second glass fiber sheet 28*b* and the first carbon sheet 30*a* are disposed in the die (not shown). Note that illustration of the second to fourth carbon sheets 30*b*, 30*c* and 30*d* is omitted.

While the composite glass fiber layer 28 is disposed in the die, the first and second glass fiber sheets 28*a*, 28*b* are formed by stacking glass fibers that intersect in mutually different directions. Furthermore, the first glass fiber sheet 28*a* is stacked on the second glass fiber sheet 28*b* such that the reinforced glass fibers of the first glass fiber sheet 28*a* are oriented in a direction substantially perpendicular to the orientation of the reinforced glass fibers of the second glass fiber sheet 28*b*. Likewise, while the composite carbon layer 30 is disposed in the die, the first to fourth carbon sheets 30*a*, 30*b*, 30*c*, 30*d* are disposed such that the reinforced glass fibers of adjacent sheets are oriented in directions substantially perpendicular to each other.

Figure 4:
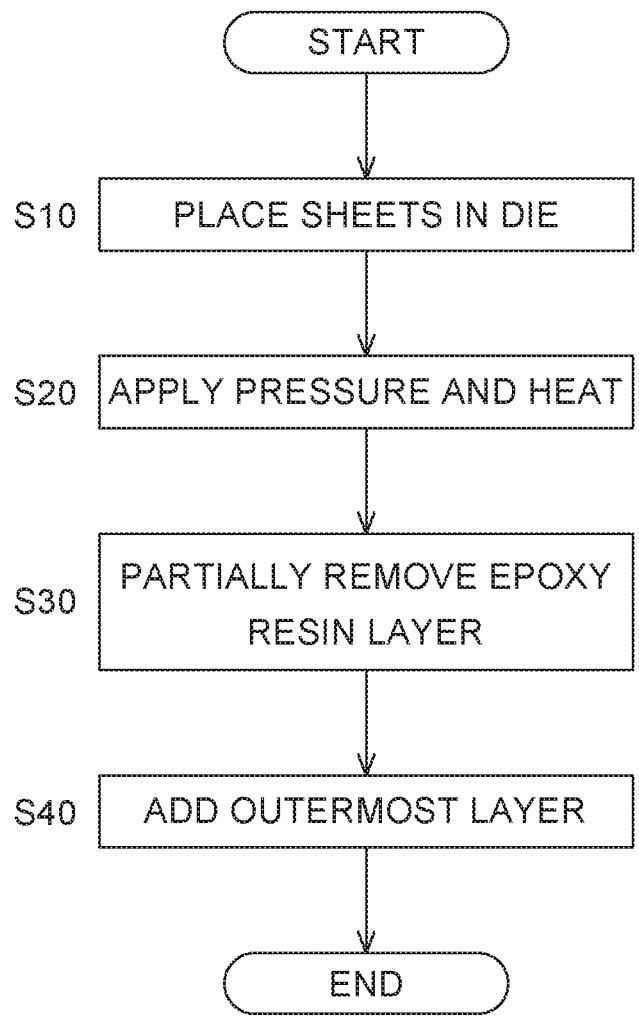
FIG. 4 is a flowchart illustrating a procedure for forming the bicycle rim illustrated in FIGS. 1 to 3.
Figure 5:
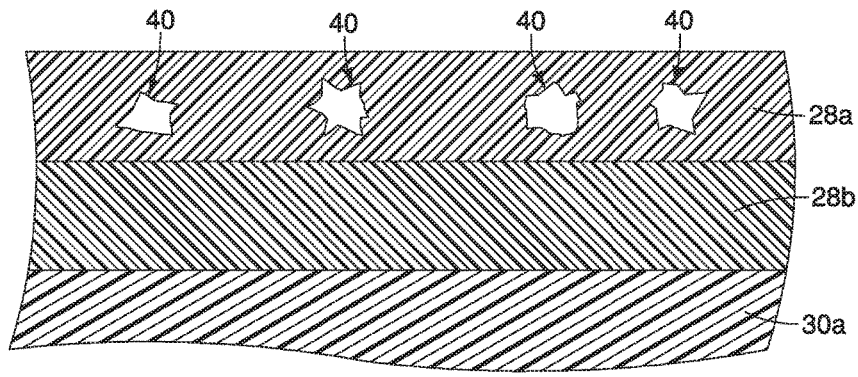
FIG. 5 is a partially enlarged cross-sectional view of a composite glass fiber layer and a composite carbon layer that are placed in a die for forming the bicycle rim.

In step S20 shown in FIG. 4, pressure and heat are applied to the composite glass fiber layer 28 and the composite carbon layer 30 in the die. Specifically, pressure and heat are applied from a side portion of the composite carbon layer 30 to a side portion of the composite glass fiber layer 28. At this time, an outer surface of the composite glass fiber layer 28 (that is, a surface opposite to the surface that is in contact with the composite carbon layer 30) is pressed against a flat portion (not shown) of the die. The pressure and heat induce melting of the epoxy resin included in the glass fiber sheets 28*a*, 28*b* of the composite glass fiber layer 28 and the first to fourth carbon sheets 30*a*, 30*b*, 30*c*, 30*d* of the composite carbon layer 30, and the composite glass fiber layer 28 and the composite carbon layer 30 are thereby joined together as a single unitary member.

Figure 6:
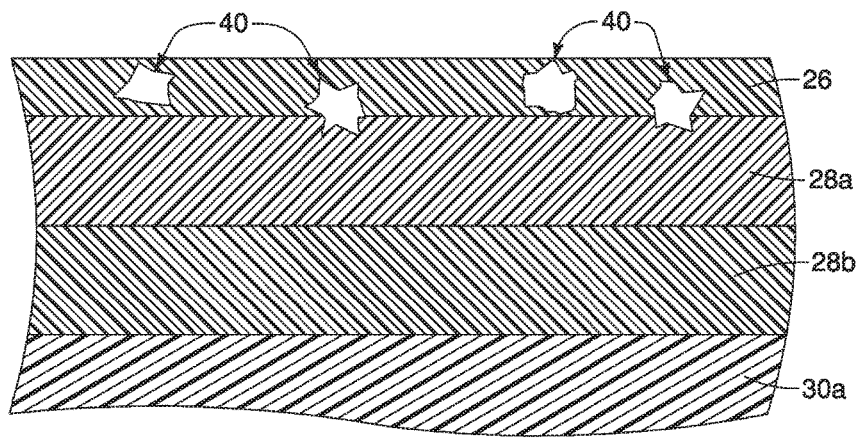
FIG. 6 is a cross-sectional view showing a state in which an epoxy resin layer is formed on the composite glass fiber layer.

Also, the pressure and heat cause the epoxy resin to move toward the outer surface of the composite glass fiber layer 28, and the soft additive granules 40 included in the glass fiber sheet 28*a* of the composite glass fiber layer 28 are enclosed. As a result, as shown in FIG. 6, an epoxy resin layer 26 is formed so as to cover the composite glass fiber layer 28, and the soft additive granules 40 are completely embedded in the epoxy resin layer 26 and/or the first glass fiber sheet 28*a*. At this time, as shown in FIG. 6, the surface of the soft additive granules 40 is not exposed from the epoxy resin layer 26 by the pressure from the flat portion of the die. Subsequently, the epoxy resin layer 26, the composite glass fiber layer 28 and the composite carbon layer 30 placed in the die are cooled and then taken out from the die. The epoxy resin layer 26 obtained in this step has a thickness of, for example, 100 μm.

Figure 7:
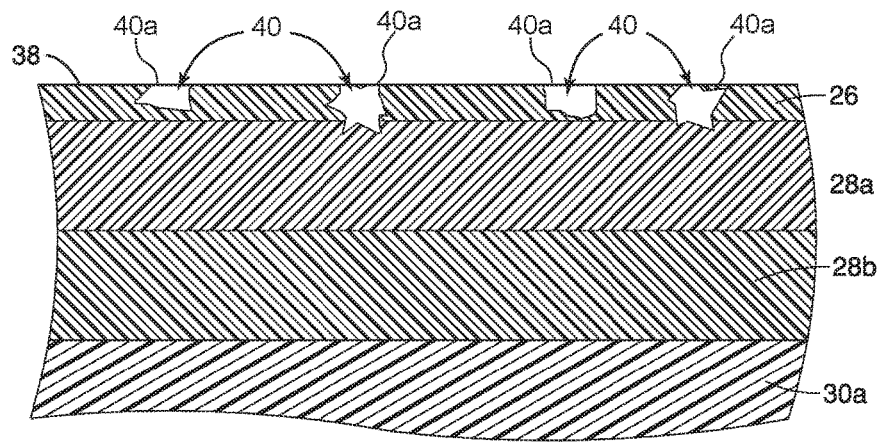
FIG. 7 is a cross-sectional view showing a state in which a portion of the epoxy resin layer is removed to partially expose at least some of the soft additive granules.

Next, in step S30, a portion of the epoxy resin layer 26 is removed so as to form the soft additive granules 40. Specifically, the soft additive granules 40 are formed by performing physical processing on a portion of the epoxy resin layer 26 by using a machining tool. The physical processing includes, for example, laser beam processing, shaving processing, and the like. Through the grinding steps, the soft additive granules 40 are embedded in the epoxy resin layer 26 such that the soft additive granules 40 are partially exposed from the nonmetallic layer (here, the epoxy resin layer 26). The partial removal of the epoxy resin layer 26 can be performed by a chemical decomposition (dissolution). As shown in FIG. 7, after the partial removal of the epoxy resin layer 26, the epoxy resin layer 26 has a thinner thickness than that shown in FIG. 6 before the partial removal of the epoxy resin layer 26, and the soft granules 40*a* are partially exposed. The epoxy resin layer 26 after the partial removal of the epoxy resin layer 26 has a thickness of, for example, 90 to 95 μm.

Figure 8:
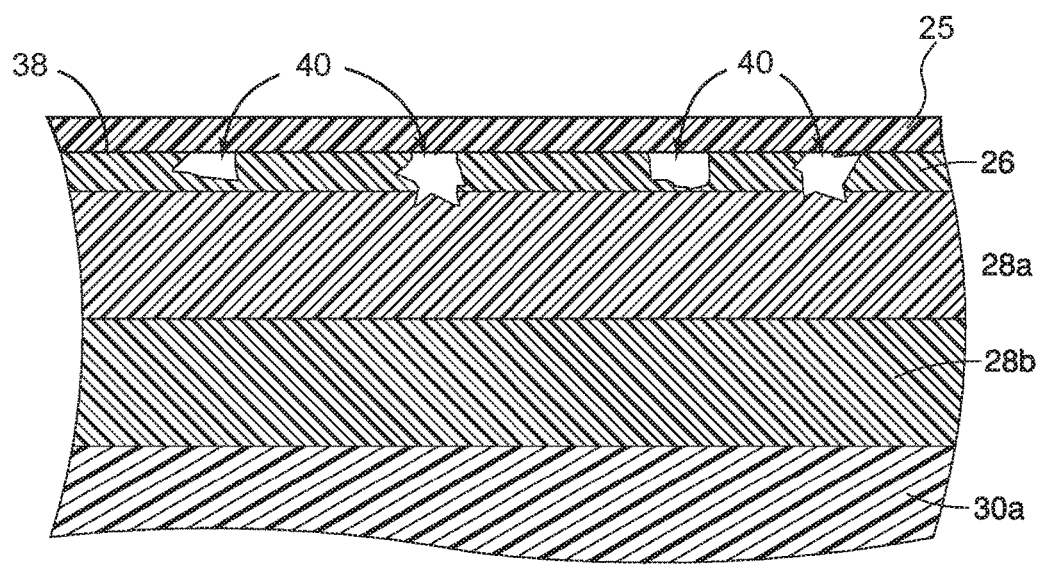
FIG. 8 is a cross-sectional view showing a state in which an outermost layer is formed on the epoxy resin layer.

In step S40, an outermost layer 25 is formed. As shown in FIG. 8, the outermost layer 25 is formed so as to cover the epoxy resin layer 26 and the soft additive granules 40 by, for example, coating. For example, an acrylic or epoxy resin is used for the outermost layer 25. With this configuration, it is possible to eliminate non-uniformity in the outer appearance of the processed surface formed in step S30 shown in FIG. 7. Furthermore, it is possible to provide a bicycle rim 12 having a more excellent outer appearance, by including a pigment in the outermost layer 25 and coloring the rim.

Second Embodiment

Figure 9:
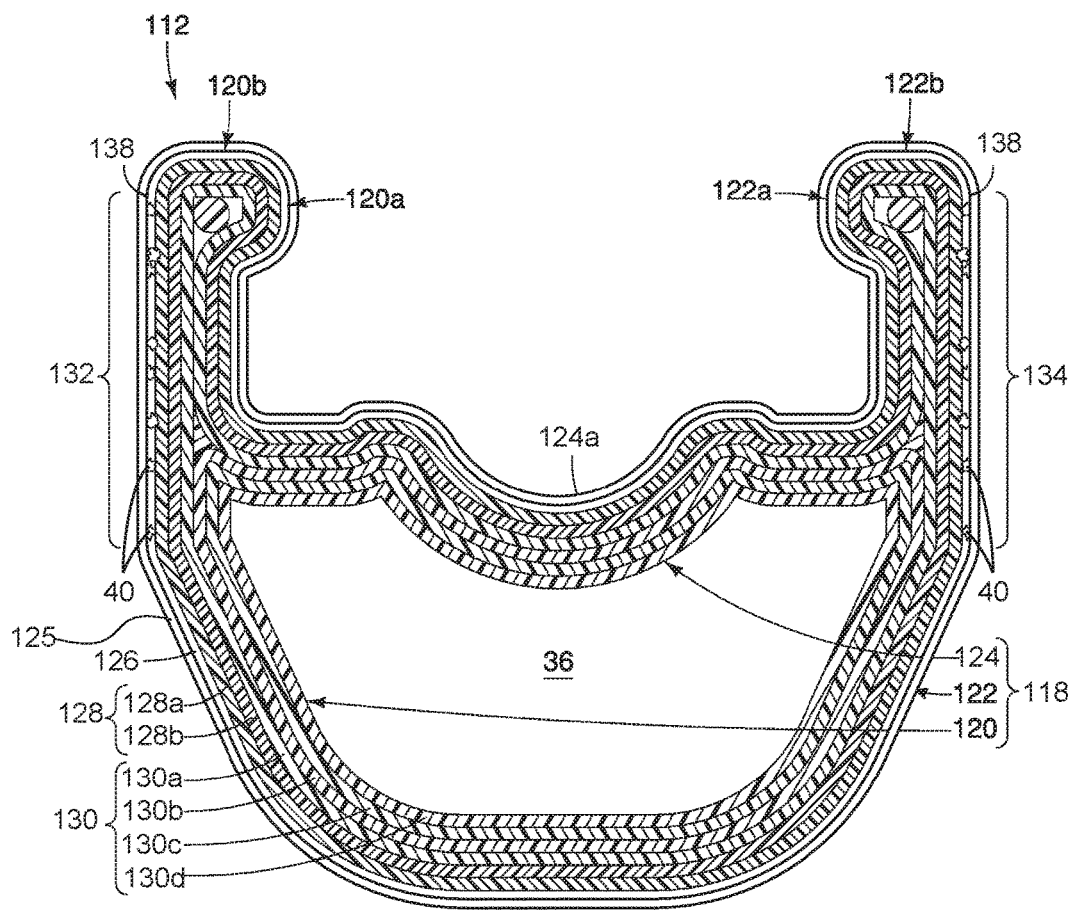
FIG. 9 is a cross-sectional view of a bicycle rim according to a second embodiment.

FIG. 9 shows a bicycle rim 112 according to a second embodiment. The bicycle rim 112 is used together with the hub assembly 14 of the first embodiment and a plurality of the spokes 16 of the first embodiment so as to constitute a wheel. The bicycle rim 112 includes a first annular side surface portion 120, a second annular side surface portion 122 and an annular connecting portion 124.

The annular connecting portion 124 extends between the first annular side surface portion 120 and the second annular side surface portion 122 so as to connect the first annular side surface portion 120 and the second annular side surface portion 122. The bicycle rim 112 according to the present embodiment is basically the same composite-type rim as that of the first embodiment except that the first and second annular side surface portions 120 and 122 include engagement portions 120*a*, 122*a* that respectively extend along outer circumferential edges 120*b*, 122*b*.

Specifically, the first annular side surface portion 120 includes the engagement portion 120*a* provided along the outer circumferential edge 120*b* in order to hold a first bead of a tire (not shown). Likewise, the second annular side surface portion 122 includes the engagement portion 122*a* provided along the outer circumferential edge 122*b* in order to hold a second bead of the tire (not shown).

The configuration and functions of the second embodiment are basically the same as those of the first embodiment. Accordingly, members that are the same as those of the first embodiment are given the same reference numerals. Also, the second embodiment, in which the first annular side surface portion 120 includes a first braking surface 132, the second annular side surface portion 122 includes a second braking surface 134, and at least one of the first and second braking surfaces 132, 134 includes soft additive granules 40, is the same as the first embodiment. Also, a description of the configuration and functions of the second embodiment that are the same as those of the first embodiment is omitted, such as the body 118 of the bicycle rim 112, the curved surface 124*a* of the annular connecting portion 124, the first and second glass fiber sheets 128*a* and 128*b* of the composite glass fiber layer 128, the first to fourth carbon fiber sheets 130*a*, 130*b*, 130*c* and 130*d* of the composite carbon layer 130, and the outermost surface 138 of the first and second braking surfaces 132 and 134.

In FIG. 9, as illustrated in the first embodiment, the outermost layer 125, the epoxy resin layer 126, the composite glass fiber layer 128, the composite carbon layer 130, and the soft additive granules 40 are schematically shown, and thus the thicknesses of the epoxy resin layer 126, the composite glass fiber layer 128 and the composite carbon layer 130, as well as the size of the soft additive granules 40 are not necessarily accurate about scale.

Third Embodiment

Figure 10:
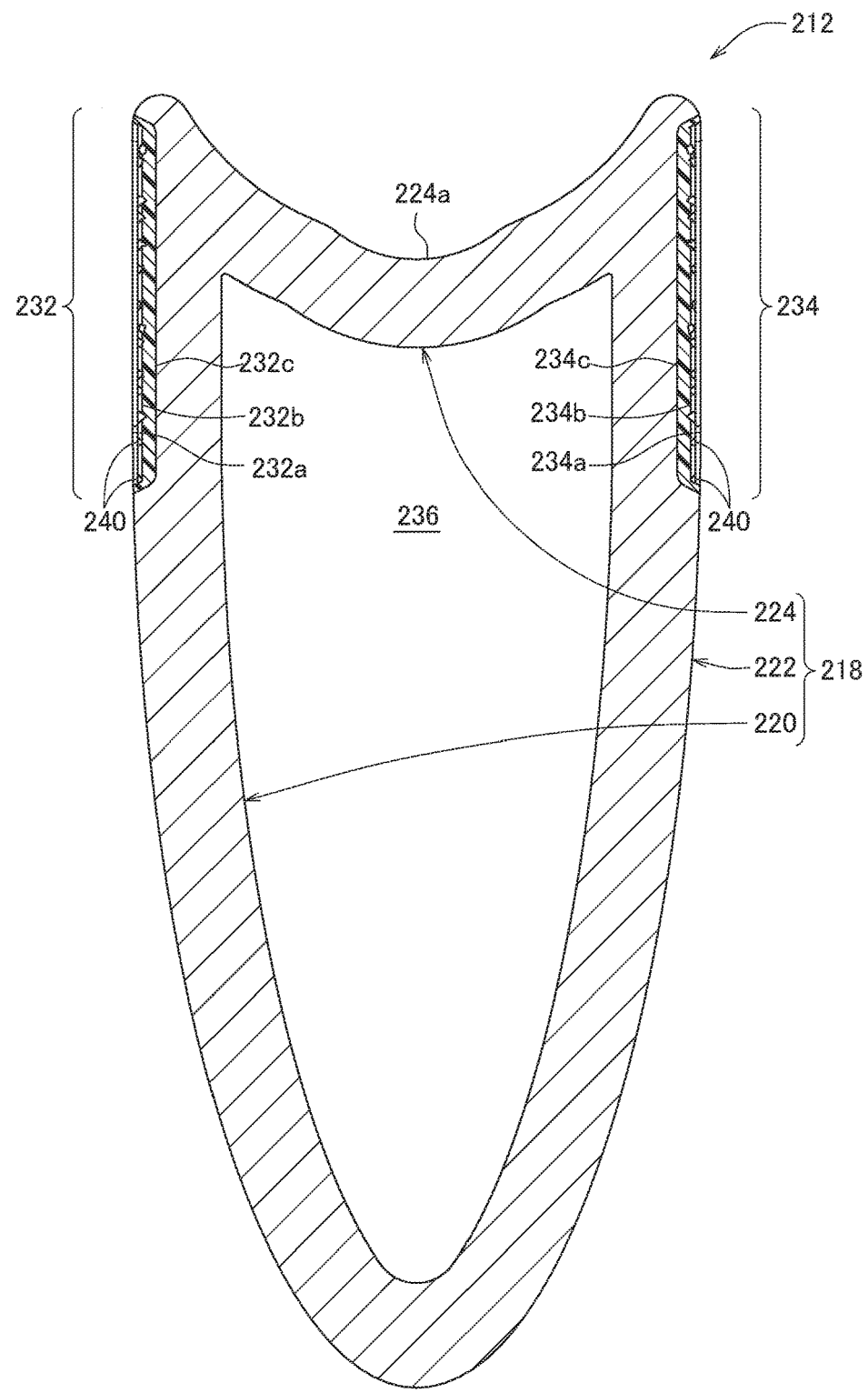
FIG. 10 is a cross-sectional view of a bicycle rim according to a third embodiment.

FIG. 10 shows a bicycle rim 212 according to a third embodiment. The bicycle rim 212 is used together with the hub assembly 14 of the first embodiment and a plurality of the spokes 16 of the first embodiment so as to constitute a wheel. The bicycle rim 212 includes a body 218 including a first annular side surface portion 220, a second annular side surface portion 222 and an annular connecting portion 224. The annular connecting portion 224 extends between the first annular side surface portion 220 and the second annular side surface portion 222 so as to connect the first annular side surface portion 220 and the second annular side surface portion 222. The first annular side surface portion 220 includes a first braking surface 232 made of a composite material. Likewise, the second annular side surface portion 222 includes a second braking surface 234 made of a composite material.

In the third embodiment, the first and second annular side surface portions 220, 222 excluding the first and second braking surfaces 232, 234, and the annular connecting portion 224 are made of a metallic material. That is, the first and second annular side surface portions 220, 222 excluding the first and second braking surfaces 232, 234, and the annular connecting portion 224 can be made of a metallic material.

The first and second annular side surface portions 220, 222 and the annular connecting portion 224 are formed by extrusion so as to have a desired cross-sectional shape and then bent into a loop, and both ends of the loop is connected by butt welding or any other means. Then, the first and second braking surfaces 232, 234 are additionally provided to the first and second annular side surface portions 220, 222. The means for providing the first and second braking surfaces 232, 234 to the first and second annular side surface portions 220, 222 is basically the same as the means shown in FIG. 4 except that the first and second braking surfaces 232, 234 are provided in the body 218 when the first and second braking surfaces 232, 234 are formed.

The overall shape of the bicycle rim 212 is the same as that of the bicycle rim 12 according to the first embodiment. Accordingly, the annular connecting portion 224 includes a tubular (tube-shaped) curved surface 224a (in other words, an annular outer circumferential surface) that extends between the first and second annular side surface portions 220, 222. Also, the first and second annular side surface portions 220, 222 and the annular connecting portion 224 form an annular internal space or region 236. The internal space or region 236 can be a void space, or can be filled with a foam material or the like.

In the third embodiment, the first and second braking surfaces 232, 234 are disposed in annular recess portions formed in the first and second annular side surface portions 220, 222. Also, instead of disposing the first and second braking surfaces 232, 234 in the annular recess portions, the first and second braking surfaces 232, 234 can be formed by being stacked on the first and second annular side surface portions 220, 222 so as to protrude annularly with respect to the adjacent outer circumferential surface of the first and second annular side surface portions 220, 222.

The first braking surface 232 includes an outermost layer 232a, an epoxy resin layer 232b and a reinforced fiber layer 232c. Likewise, the second braking surface 234 includes an outermost layer 234a, an epoxy resin layer 234b and a reinforced fiber layer 234c. Also, the first and second braking surfaces 232, 234 include a plurality of soft additive granules 240. The soft additive granules 240 can be included only in either one of the first and second braking surfaces 232, 234. It is preferable that the soft additive granules 240 are included in at least one of the first and second braking surfaces 232, 234.

The outermost layers 232a, 234a have the same configuration as those of the first embodiment except that the outermost layers 232a, 234a are formed only in the first and second braking surfaces 232, 234. Although the reinforced fiber layers 232c, 234c are shown as being made of a single material, the reinforced fiber layers 232c, 234c can be formed of one or more stacked reinforced fiber layers. Also, as described in the first embodiment, the reinforced fiber layers 232c, 234c can be impregnated with the epoxy resin included in the epoxy resin layers 232b, 234b during a molding step.

In the third embodiment, it is preferable that the reinforced fiber layers 232c, 234c are formed of one or more glass fiber layers and/or one or more carbon layers. The epoxy resin layers 232b, 234b and the reinforced fiber layers 232c, 234c are an example of a nonmetallic layer.

The soft additive granules 240 are the same as the soft additive granules according to the first embodiment. That is, the soft additive granules 240 include an elastomer material such as a nitrile rubber or a fluorinated elastomer. The soft additive granules 240 include granules having a predetermined grain size of 850 to 1000 μm. The soft additive granules 240 are irregularly shaped fine granules. However, if the soft additive granules 240 are formed by a different process, the soft additive granules 240 can be regularly shaped.

In FIG. 10, as illustrated in the first embodiment, the outermost layers 232a, 234a, the epoxy resin layers 232b, 234b, the reinforced fiber layers 232c, 234c, and the soft additive granules 240 are schematically shown. Accordingly, the thicknesses of the layers 232a, 234a, 232b, 234b, 232c, 234c, as well as the size of the soft additive granules 240 are not necessarily accurate about scale.

Fourth Embodiment

Figure 11:
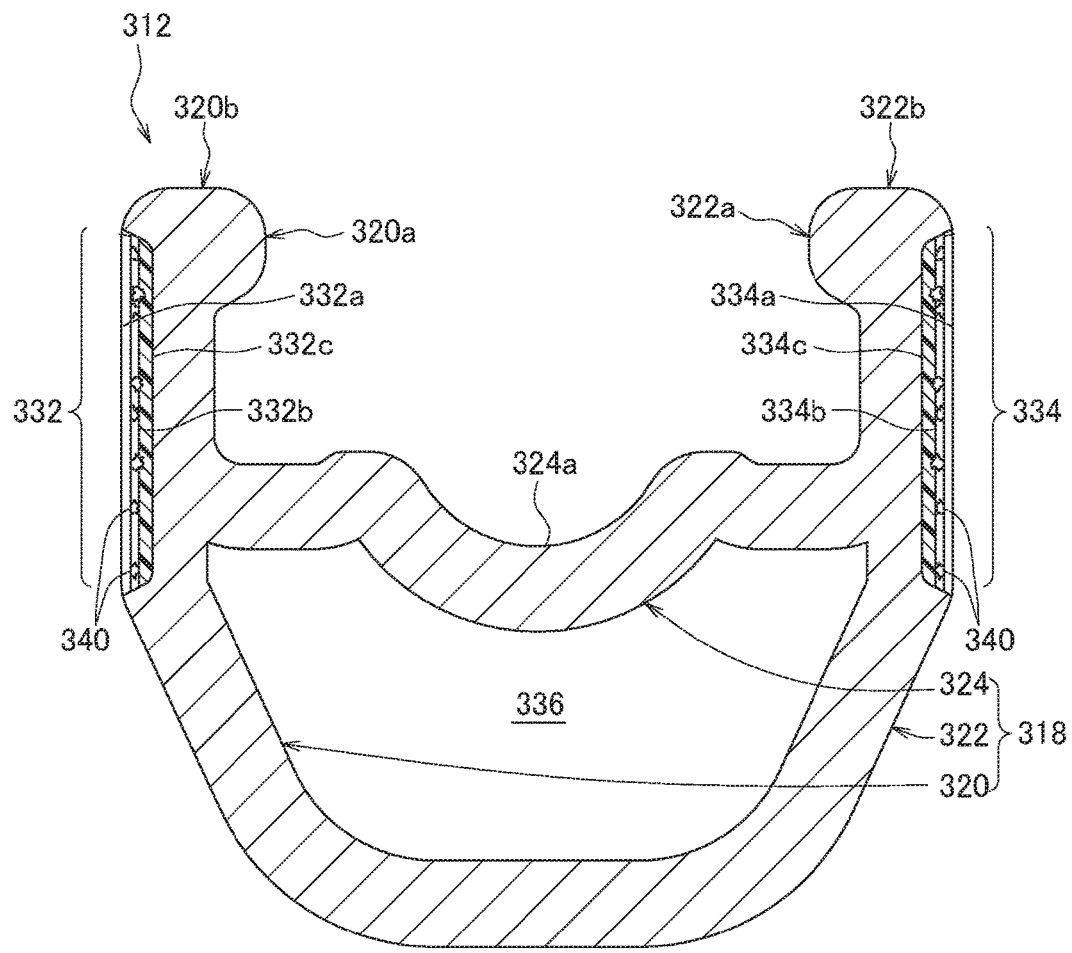
FIG. 11 is a cross-sectional view of a bicycle rim according to a fourth embodiment.

FIG. 11 shows a bicycle rim 312 according to a fourth embodiment. The bicycle rim 312 is used together with the hub assembly 14 of the first embodiment and a plurality of the spokes 16 of the first embodiment so as to constitute a wheel. The bicycle rim 312 includes a body 318 including a first annular side surface portion 320, a second annular side surface portion 322 and an annular connecting portion 324. The annular connecting portion 324 extends between the first annular side surface portion 320 and the second annular side surface portion 322 so as to connect the first annular side surface portion 320 and the second annular side surface portion 322.

The first annular side surface portion 320 includes a first braking surface 332 which is made of a composite material. Likewise, the second annular side surface portion 322 includes a second braking surface 334 which is made of a composite material. In the fourth embodiment, the first and second annular side surface portions 320, 322 excluding the first and second braking surfaces 332, 334, and the annular connecting portion 324 are made of a metallic material such as an aluminum alloy.

The first and second annular side surface portions 320, 322 and the annular connecting portion 324 are formed by extrusion to have a desired cross-sectional shape and then bent into a loop, and both ends of the loop is connected by butt welding or any other means. Then, the first and second braking surfaces 332, 334 are additionally provided to the first and second annular side surface portions 320, 322. The means for providing the first and second braking surfaces 332, 334 to the first and second annular side surface portions 320, 322 is basically the same as the means shown in FIG. 4 except that the first and second braking surfaces 332, 334 are provided in the body 318 when the first and second braking surfaces 332, 334 are formed.

The overall shape of the bicycle rim 312 is the same as that of the bicycle rim 112 according to the second embodiment. That is, the first and second annular side surface portions 320, 322 include engagement portions 320a and 322a that respectively extend along outer circumferential edges 320b and 322b. Also, the annular connecting portion 324 includes a tubular (tube-shaped) curved surface 324a (or in other words, an annular outer circumferential surface) that extends between the first and second annular side surface portions 320, 322. Also, the first and second annular side surface portions 320, 322 and the annular connecting portion 324 form an annular internal space or region 336. The internal space or region 336 can be a void space, or can be filled with a foam material or the like.

In the fourth embodiment, the first and second braking surfaces 332, 334 are disposed in annular recess portions formed in the first and second annular side surface portions 320, 322. Also, instead of disposing the first and second braking surfaces 332, 334 in the annular recess portions, the first and second braking surfaces 332, 334 can be formed by being stacked on the first and second annular side surface portions 320, 322 so as to protrude annularly with respect to the adjacent outer circumferential surface of the first and second annular side surface portions 320, 322.

The first braking surface 332 includes an outermost layer 332a, an epoxy resin layer 332b and a reinforced fiber layer 332c. Likewise, the second braking surface 334 includes an outermost layer 334a, an epoxy resin layer 334b and a reinforced fiber layer 334c. Also, the first and second braking surfaces 332, 334 include a plurality of soft additive granules 340. The soft additive granules 340 can be included only in one of the first and second braking surfaces 332, 334. It is preferable that the soft additive granules 340 are included in at least one of the first and second braking surfaces 332, 334.

The outermost layers 332a and 334a have the same configuration as those of the first embodiment except that the outermost layers 332a and 334a are formed only in the first and second braking surfaces 332, 334. Although the reinforced fiber layers 332c and 334c are shown as being made of a single material, the reinforced fiber layers 332c and 334c can be formed of one or more stacked reinforced fiber layers. Also, as described in the first embodiment, the reinforced fiber layers 332c and 334c can be impregnated with the epoxy resin included in the epoxy resin layers 332b and 334b during a molding step. In the fourth embodiment, it is preferable that the reinforced fiber layers 332c and 334c are formed of one or more glass fiber layers and/or one or more carbon layers. The epoxy resin layers 332b and 334b and the reinforced fiber layers 332c and 334c are an example of a nonmetallic layer.

The soft additive granules 340 are the same as the soft additive granules according to the first embodiment. That is, the soft additive granules 340 include an elastomer material such as a nitrile rubber or a fluorinated elastomer. The soft additive granules 340 include granules having a predetermined grain size of 850 to 1000 μm. The soft additive granules 340 are irregularly shaped fine granules. However, if the soft additive granules 340 are formed by a different process, the soft additive granules 340 can be regularly shaped.

In FIG. 11, as illustrated in the first embodiment, the outermost layers 332a and 334a, the epoxy resin layers 332b and 334b, the reinforced fiber layers 332c and 334c and the soft additive granules 340 are schematically shown. Accordingly, the thicknesses of the layers 332a, 334a, 332b, 334b, 332c, 334c, as well as the size of the soft additive granules 340 are not necessarily true to scale.

Other Embodiment

The present invention is not limited to the embodiments given above, and various variations or modifications can be made without departing from the scope of the present invention.

(a) The nonmetallic layer according to the first and second embodiments is composed of the epoxy resin layer 26 and the composite glass fiber layer 28, but the nonmetallic layer can be composed only of a resin layer. Likewise, the nonmetallic layer according to the third and fourth embodiments is composed of the epoxy resin layer 232a, 234a, 332a or 334a and the reinforced fiber layer 232c, 234c, 332c or 334c, but the nonmetallic layer can be composed only of a resin layer.

(b) In the first and second embodiments, the first annular side surface portion 20, the second annular side surface portion 22 and the annular connecting portion 24 are composed of the composite carbon layer 30, but they can be made of a metallic material.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle component. Accordingly, these directional terms, as utilized to describe the bicycle component should be interpreted relative to a bicycle in an upright riding position on a horizontal surface and that is equipped with the bicycle component. The terms "left" and "right" are used to indicate the "right" when referencing from the right side as viewed from the rear of the bicycle, and the "left" when referencing from the left side as viewed from the rear of the bicycle.

Also, it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle rim comprising:
a first annular side surface portion including a first braking surface;
a second annular side surface portion including a second braking surface;
an annular connecting portion connecting the first annular side surface portion and the second annular side surface portion;
a plurality of additive granules disposed in at least one of the first annular side surface portion and the second annular side surface portion;
a nonmetallic layer disposed in at least one of the first annular side surface portion and the second annular side surface portion, the additive granules being at least partially embedded in the nonmetallic layer; and
an outermost layer covering the nonmetallic layer and the additive granules.

2. The bicycle rim according to claim 1, wherein the outermost layer includes a pigment.

3. The bicycle rim according to claim 1, wherein the outermost layer is made of an acrylic or epoxy resin.

4. The bicycle rim according to claim 1, wherein the additive granules are disposed in both of the first annular side surface portion and the second annular side surface portion.

5. The bicycle rim according to claim 1, wherein the additive granules are partially embedded in the nonmetallic layer.

6. The bicycle rim according to claim 1, wherein at least some of the additive granules are at least partially exposed from the nonmetallic layer.

7. The bicycle rim according to claim 1, wherein the additive granules are embedded in the nonmetallic layer having an outer ground surface partially exposing at least some of the additive granules.

8. The bicycle rim according to claim 1, wherein the nonmetallic layer is a resin layer.

9. The bicycle rim according to claim 1 wherein the nonmetallic layer includes an epoxy resin layer in an outermost surface thereof.

10. The bicycle rim according to claim 9, wherein the additive granules are partially embedded in the epoxy resin layer.

11. The bicycle rim according to claim 9, wherein the nonmetallic layer further includes a glass fiber layer, and
the epoxy resin layer is formed on the glass fiber layer.

12. The bicycle rim according to claim 11, wherein the additive granules are partially embedded in the glass fiber layer.

13. The bicycle rim according to claim 1, wherein the additive granules are made of an elastomer material.

14. The bicycle rim according to claim 13, wherein the elastomer material is a nitrile rubber.

15. The bicycle rim according to claim 13, wherein the elastomer material is a fluorinated synthetic rubber.

16. The bicycle rim according to claim 1, wherein the annular connecting portion includes a curved surface that extends between the first annular side surface portion and the second annular side surface portion, and a tire is engaged with the curved surface.

17. The bicycle rim according to claim 1, wherein each of the first annular side surface portion and the second annular side surface portion includes an engagement portion provided along an outer circumferential edge to hold a tire.

18. The bicycle rim according to claim 1, wherein the first annular side surface portion, the second annular side surface portion and the annular connecting portion are made of carbon.

19. The bicycle rim according to claim 1, wherein the first annular side surface portion, the second annular side surface portion and the annular connecting portion are made of a metallic material.

* * * * *